(12) United States Patent
Tagome et al.

(10) Patent No.: US 6,858,961 B2
(45) Date of Patent: Feb. 22, 2005

(54) MOTOR

(75) Inventors: Masaki Tagome, Hirakata (JP); Yasuhiro Kondo, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 373 days.

(21) Appl. No.: 10/229,129

(22) Filed: Aug. 28, 2002

(65) Prior Publication Data

US 2003/0042814 A1 Mar. 6, 2003

(30) Foreign Application Priority Data

Aug. 29, 2001 (JP) ........................................ 2001-259788
Jun. 28, 2002 (JP) ........................................ 2002-189581

(51) Int. Cl.⁷ ........................... H02K 21/12; H02K 1/00; H02K 1/22
(52) U.S. Cl. ........................... 310/156.56; 310/156.53; 310/156.55; 310/216; 310/261
(58) Field of Search ........................ 310/156.01, 156.38, 310/156.48, 156.53, 156.54, 156.55, 156.56, 156.57, 216–218, 261, 265

(56) References Cited

U.S. PATENT DOCUMENTS 6,008,559 A * 12/1999 Asano et al. .......... 310/156.53
6,218,753 B1 * 4/2001 Asano et al. .......... 310/156.53

FOREIGN PATENT DOCUMENTS

| EP | 0923186 | 6/1999 |
| JP | 07059310 | 3/1995 |
| JP | 09294362 | 11/1997 |
| JP | 00050584 | 2/2000 |

OTHER PUBLICATIONS

English Language Abstract for JP Appln. No. 09–294362.
English Language Abstract for JP Appln. No. 07–059310.
English Language Abstract for JP Appln. No. 2000–050584.

* cited by examiner

Primary Examiner—Dang Le
Assistant Examiner—Leda Pham
(74) Attorney, Agent, or Firm—Greenblum & Bernstein, P.L.C.

(57) ABSTRACT

A motor comprising: a rotor including a permanent magnet type rotor unit having a plurality of permanent magnets and a reluctance type rotor unit having a plurality of magnetic salient pole portions and a plurality of slits for preventing flux leakage, the rotor units being coupled to each other in an axial direction; and a stator for generating a field for driving the rotor. Elongated holes for preventing the short-circuit of magnetic fluxes are arranged near edges of the permanent magnet of the permanent magnet type rotor unit. The elongated holes or notches are arranged within a range defined so that $0.95\alpha \leq \theta \leq 1.05\alpha$ with $\alpha=\{(360/S)-R\}/2$ (degrees), where $\theta$ is an angle formed between a magnetic pole boundary and a center of the elongated hole or the notch in a forward direction of rotation of the rotor with respect to a center of a rotating shaft, R is an angle formed by a tooth width of the stator with respect to the center of the rotating shaft, P is the number of rotor poles, and the number of stator slots is $S=3P/2$.

29 Claims, 14 Drawing Sheets

MOTOR

The present disclosure relates to subject matter contained in priority Japanese Patent Application Nos. 2001-259788 and 2002-189581, filed on Aug. 29, 2001 and Jun. 28, 2002 respectively, the contents of which is herein expressly incorporated by reference in its entirety.

BACKGROUND OF THE INVENTION

1. Field of the Invention

The present invention relates to motors, and more particularly to a synchronous motor with reduced noise and vibrations in a combination of rotor structures.

2. Description of the Related Art

Japanese Patent Laid-Open Publication No. Hei 9-294362 discloses a Conventional synchronous motor that has different types of rotors axially coupled to each other for providing an enhanced flexibility in design. Referring to FIG. 12, a motor 1 comprises a rotor 2 having a permanent magnet rotor unit 4 and a reluctance rotor unit 6 axially coupled to each other, and a stator 3 for generating a field for driving the rotor 2. In this arrangement, the permanent magnet rotor unit 4 has a plurality of permanent magnets disposed therein, and the reluctance rotor unit 6 has a plurality of salient pole portions formed therein.

Japanese Patent Laid-Open Publication No. Hei 7-59310 discloses another conventional motor, in which different types of rotors are axially coupled to each other with a nonmagnetic material interposed therebetween for providing an enhanced flexibility in design in the same manner, and preventing flux leakage and thereby magnetic coupling between the different types of rotors. The motor is also configured to shift the different types of rotors, when combined axially, by a predetermined angle deviation in the direction of rotation and thereby provide reduced torque pulsation.

However, the conventional motor disclosed in Japanese Patent Laid-Open Publication No. Hei 9-294362 having different types of rotors being combined to each other, cannot prevent the motor from being deterioration in characteristics due to the interaction between the rotors. In other words, the structure that employs one rotor having permanent magnets covered with the core of the other rotor cannot prevent the flux leakage of the permanent magnet to the other rotor, thereby causing deterioration in characteristics.

On the other hand, the conventional motor disclosed in Japanese Patent Laid-Open Publication No. Hei 7-59310 has the different types of rotors axially coupled to each other with the nonmagnetic material therebetween, and the nonmagnetic material prevents deterioration in characteristics caused by flux leakage. However, arrangement of the nonmagnetic material increases size and costs of the motor. Torque pulsation of the motor is reduced by axially combining the different types of rotors with a predetermined angle deviation in the direction of rotation. However, cogging torque generated from the permanent magnet causes the motor to produce torque pulsation, resulting in generating of noise and vibrations of the motor. Accordingly, cogging torque generated by at least one of the different types of rotors is higher, reduction in noise and vibration of the motor may be insufficient.

SUMMARY OF THE INVENTION

In light of the foregoing conventional problems, an object of the present invention is to provide a motor in which different types of rotors are coupled to each other to enhance flexibility in design and to significantly reduce noise and vibrations without increasing the size and costs of the motor.

A motor according to the present invention includes: a rotor including a permanent magnet type rotor unit having a plurality of permanent magnets and a reluctance type rotor unit having a plurality of magnetic salient pole portions and a plurality of slits for preventing magnetic flux leakage, the rotor units being coupled to each other in an axial direction with a predetermined angle deviation in a direction of rotation; and a stator for generating a field for driving the rotor. Here, the permanent magnet type rotor unit has slits or notches near ends of the permanent magnets for preventing short-circuit of magnetic flux. The elongated holes or the notches are arranged within a range defined so that $0.95\alpha \leq \theta \leq 1.05\alpha$ with $\alpha=\{(360/S)-R\}/2$ (degrees), where $\theta$ is an angle formed between a magnetic pole boundary and a center of the elongated hole or the notch in a forward direction of rotation of the rotor with respect to a center of a rotating shaft, R is an angle formed by a tooth width of the stator with respect to the center of the rotating shaft, P is the number of rotor poles, and the number of stator slots is $S=3P/2$. Defining the shape of the elongated hole or the notch of the permanent magnet type rotor unit for preventing the short-circuit of magnetic fluxes to be corresponded to the tooth width of the stator to be applicable to a concentrated-winding type stator, cogging torque generated by the permanent magnet type rotor unit is significantly reduced. Axially combining the permanent magnet type rotor unit and the reluctance type rotor unit, the reluctance type rotor unit generates no cogging torque in the absence of permanent magnets and generates a torque pulsation to cancel out torque pulsations generated by applying current to the stator for rotating the permanent magnet type rotor unit, the torque pulsations are reduced and thereby the noise and vibrations of the motor are reduced.

The motor including the reluctance type rotor unit may be arranged with nonmagnetic materials in the slits for preventing flux leakage more efficiently and suppressing a reduction in strength ascribable to the slits.

The motor may have a clearance between the reluctance type rotor unit and the stator made smaller than a clearance between the permanent magnet type rotor unit and the stator. The permanent magnet type rotor unit that undergoes higher centrifugal distortion due to the provision of the permanent magnets is given the greater clearance. Consequently, the permanent magnet type rotor unit and the reluctance type rotor unit are made equal in the limit of rotation speed, thereby allowing higher rotation speed. Since the clearance of the permanent magnet type rotor unit has a smaller influence on torque characteristics and the clearance of the reluctance type rotor unit has a greater influence on the same, the reluctance type rotor unit exerts a significant effect of improving the torque characteristics. The reluctance type rotor unit thus improves in efficiency.

The motor may include a bearing for rotatably supporting the rotor. With the bearing of greater supporting strength being arranged on a side of the permanent magnet type rotor unit, the rotor is stably supported with compact configuration and has minimized rotating shaft vibrations because of the rational bearing arrangement that the rotor is supported by the bearing of greater supporting strength on the side of the permanent magnet type rotor unit which is high in mass.

The rotor may include a first reluctance type rotor unit adjoining to the permanent magnet type rotor unit and a second reluctance type rotor unit adjoining to the first reluctance type rotor unit alone. In this case, the first reluctance type rotor unit has slits for preventing flux leakage from the permanent magnets and has no angle deviation from the permanent magnet type rotor unit in the direction of rotation. The first reluctance type rotor unit and the second reluctance type rotor unit are given an angle deviation therebetween in the direction of rotation. The absence of an angle deviation between the permanent magnet type rotor unit and the first reluctance type rotor unit surely prevents flux leakage from the permanent magnets at between the rotor units and avoid deterioration in characteristics. Besides, the absence of a nonmagnetic material allows compact configuration and cost reduction without necessitating a drop in torque for the sake of flux leakage prevention. In addition, the provision of an arbitrary angle deviation between the first and second reluctance type rotor units makes it possible to obtain arbitrary desired torque characteristics such as higher torque and reduced vibration.

The motor may include a plurality of keyways arranged for fixing a rotating shaft to the permanent magnet type rotor unit and the reluctance type rotor unit so as to make a relative position between the permanent magnet type rotor unit and the reluctance type rotor unit selectable in the direction of rotation, the rotating shaft connecting the rotor to exterior. Torque characteristic requirements are satisfied by selecting the keyways accordingly. Thereby, the motor is used common to a variety of torque characteristic requirements, which allows a reduction in cost.

The motor may comprise a rotor having a plurality of permanent magnets and a stator for generating a field for driving the rotor. The motor comprises elongated holes or notches arranged near edges of the permanent magnets for preventing short-circuit of magnetic flux. The elongated holes or the notches are arranged within the range defined by the aforementioned $\theta$ and $\alpha$ so that $0.95\alpha \leq \theta \leq 1.05\alpha$. This arrangement significantly reduces cogging torque generated by the rotor and thereby the noise and vibrations of the motor are reduced.

An outer rotor type motor including a cylindrical rotor arranged rotatably around the stator provides the aforementioned effect.

A compressor including the foregoing motor is reduced in noise and vibrations. This eliminates or reduces absorbers used for reducing noise and vibrations in conventional compressors, thereby reduces manufacturing cost.

A hybrid electric vehicle, a fuel-cell electric vehicle, or an electric vehicle including the foregoing motor is reduced in noise, vibrations, and the weight. This increases running efficiency.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

Figure 12:
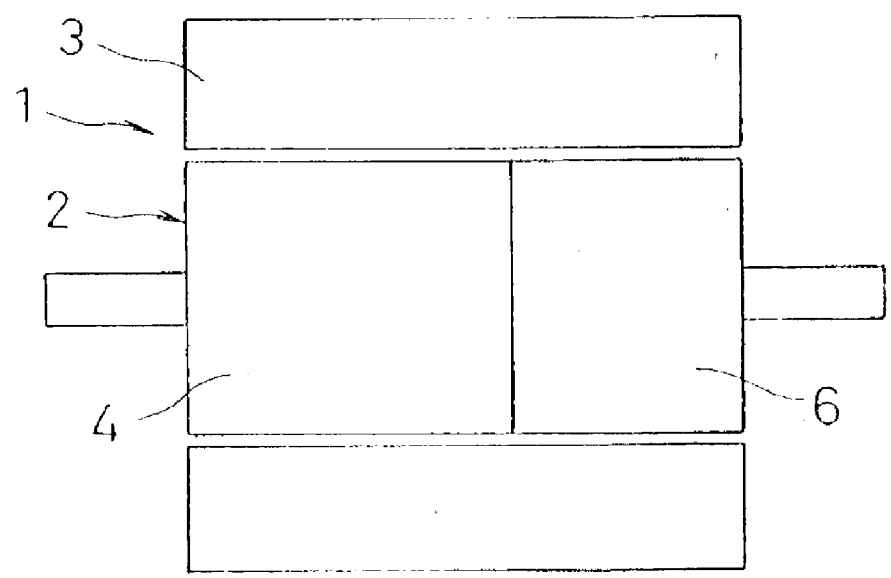
FIG. 12 is a schematic longitudinal sectional view showing the configuration example of a conventional motor.

Hereinafter, a motor according to a first embodiment of the present invention will be explained below with reference to FIGS. 1A through 2B. The entire configuration of the motor is substantially the same as that of the motor described with reference to FIG. 12, and only the main portion of the invention will be described.

Figure 1A:
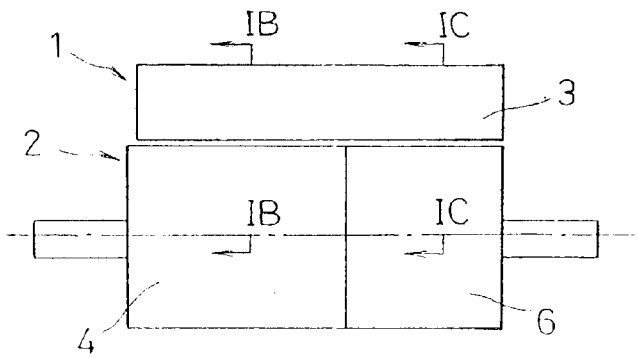
FIG. 1A is a longitudinal sectional view showing the configuration of a motor according to a first embodiment of the present invention.
Figure 1B:
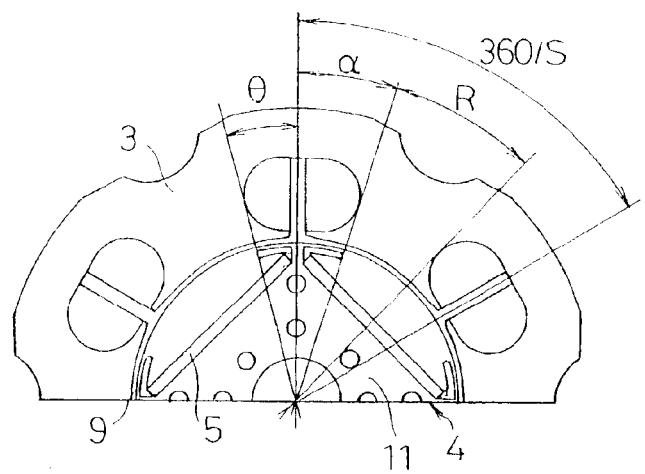
FIG. 1B is a cross-sectional view taken along the arrowed line IB—IB of FIG. 1A.
Figure 1C:
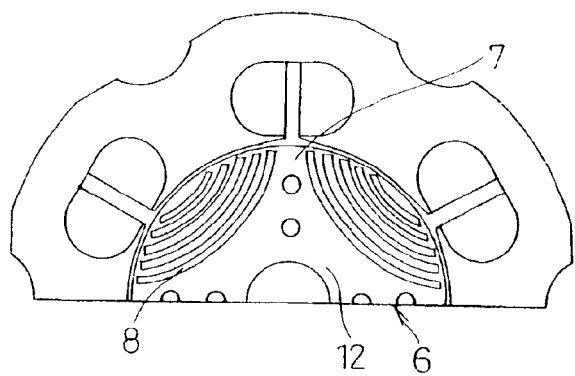
FIG. 1C is a cross-sectional view taken along the arrowed line IC—IC of FIG. 1A.

FIG. 1A shows a rotor 2 and part of a stator 3 of the motor 1. The rotor 2 of the motor 1 includes a permanent magnet type rotor unit 4 shown in FIG. 1B and a reluctance type rotor unit 6 shown in FIG. 1C. The permanent magnet type rotor unit 4 is configured to have permanent magnets 5, such as four (2n, n=2) rare-earth magnets or ferrite magnets, embedded in a rotor core 11 that has rotor-core electromagnetic steel sheets punched into a generally circular shape and stacked on top of one another. The permanent magnets 5 are arranged so as to alternate between the N and S poles along the circumferential direction.

Elongated holes 9 are arranged within a predetermined range along the outer circumferential surface of the rotor 2 near both the ends of the permanent magnet 5 of the rotor core 11 in the direction of rotation. The elongated holes 9 are arranged within the range defined so that $0.95\alpha \leq \theta \leq 1.05\alpha$ with $\alpha = \{(360/S) - R\}/2$ (degrees), where the number of stator slots is $S(=3P/2)$, and the number of rotor poles is $P(=2n)$. In the equations, $\theta$ is an angle formed between a magnetic pole boundary and the center of the elongated hole 9 in the forward direction of rotation of the rotor pole with respect to the center of a rotating shaft, and R is an angle formed by the tooth width of the stator 3 respecting to the center of the rotating shaft.

Figure 10A:
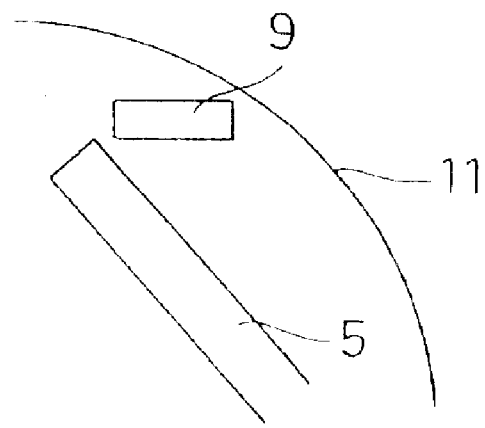
FIG. 10A is an enlarged view showing an elongated hole of a different shape and FIG. 10B is an enlarged view showing a notch.
Figure 10B:
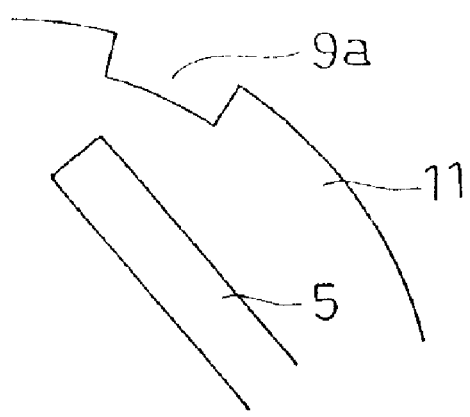

The elongated holes 9 may be formed in the shape as shown in FIG. 10A, or notches 9a as shown in FIG. 10B may be arranged instead of the elongated holes 9.

The reluctance type rotor unit 6 includes a rotor core 12 having four (2n, n=2) magnetic salient pole portions 7 and a plurality of arc-shaped slits 8 provided therebetween for preventing flux leakage from the permanent magnet 5.

The rotor 2 is constituted by coupling the permanent magnet type rotor unit 4 and the reluctance type rotor unit 6 to each other so that the permanent magnet 5 and the magnetic salient pole portion 7 form electric angle of 90 degrees therebetween with a predetermined angle deviation δ in the direction of rotation from the principal position of the rotor 2.

Figure 2A:
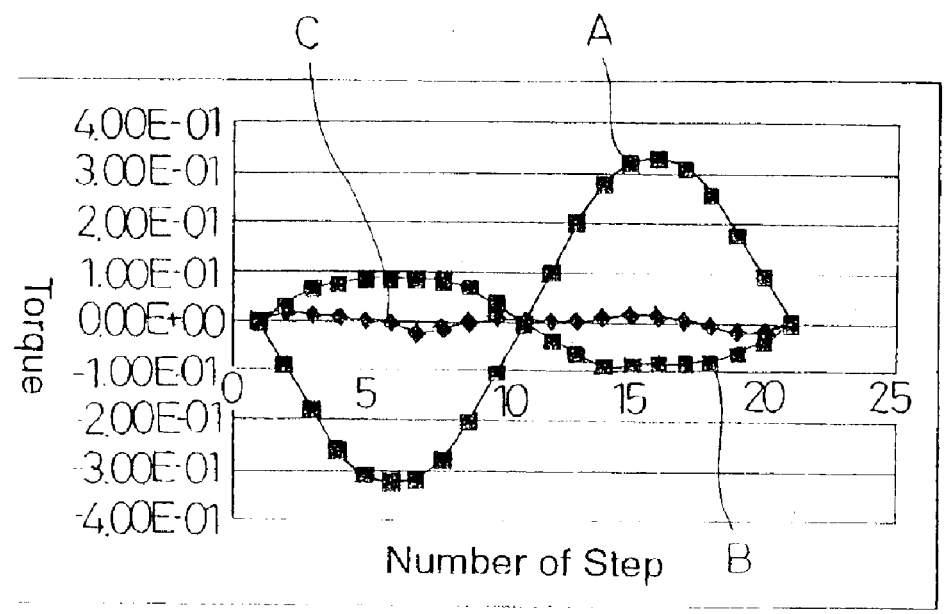
FIGS. 2A and 2B are torque characteristic charts of the motor of the present invention, FIG. 2A showing cogging torque characteristics and FIG. 2B showing torque ripple characteristics.

With the aforementioned arrangement, the cogging torque characteristics of the permanent magnet rotor unit 4 are as shown in FIG. 2A. That is, assuming that the angle R formed by the width of the tooth respecting to the center of rotation is 30 degrees, the number of rotor poles P is four, and the number of stator slots S is six, $\alpha = \{(360/6) - 30\}/2 = 15$ degrees. However, for the range θ of the elongated hole 9 so that $\theta < 0.95\alpha$, more specifically, for θ=11.2 degrees, the cogging torque characteristic is shown in a line A. For $\theta > 1.05\alpha$, more specifically, for θ=18.8 degrees, the cogging torque characteristic is shown in a line B. In contrast to these, for the range θ of the elongated hole 9 so that $0.95\alpha \leq \theta \leq 1.05\alpha$, more specifically, for θ=15 degrees, the cogging torque characteristic is shown in a line C, and the cogging torque generated by the permanent magnet type rotor unit 4 is significantly reduced.

Figure 2B:
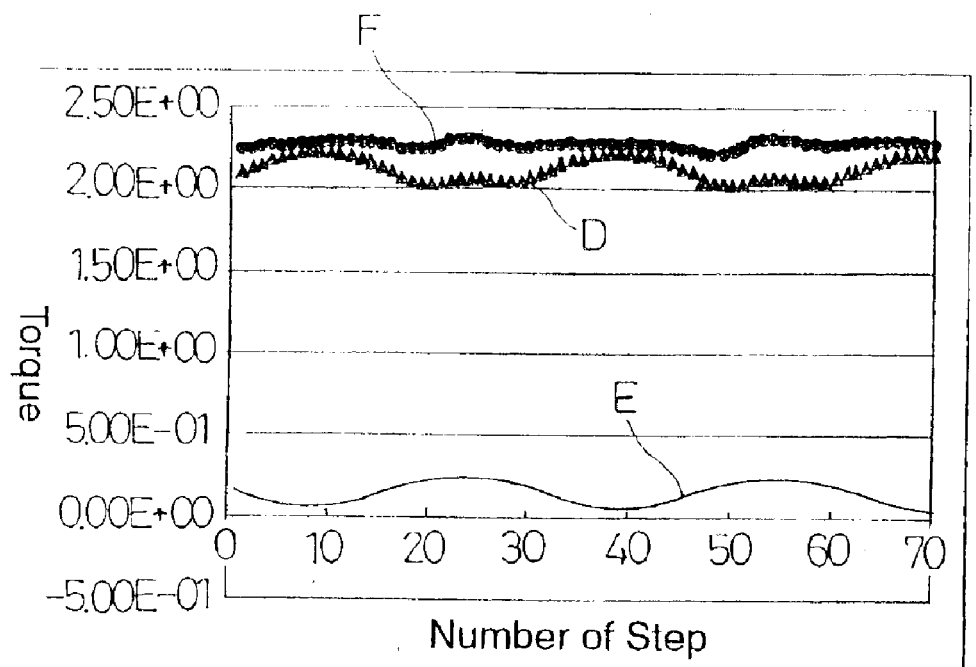

Also, the permanent magnet type rotor unit 4 and the reluctance type rotor unit 6 are axially coupled to each other with a predetermined angle deviation δ in the direction of rotation, wherein the reluctance type rotor unit 6 has a plurality of magnetic salient pole portions 7 and a plurality of slits 8 for preventing flux leakage. Accordingly, as shown in FIG. 2B, the torque ripple characteristic of the permanent magnet type rotor unit 4 is shown in line D, and the torque ripple characteristic of the reluctance type rotor unit 6 is shown in line E. The both characteristics shown in the line D and E cancel out each other, thereby the motor 1 produces the torque ripple characteristic shown in line F. This results in significant reduction of the torque ripples. Therefore, the rotor 2 having aforementioned different types of rotor units 4, 6 axially coupled to each other reduces noise and vibrations.

Figure 11A:
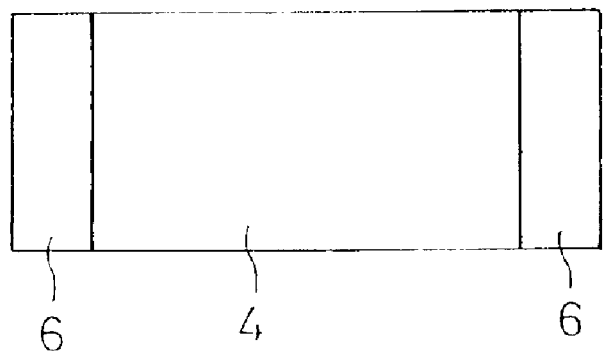
FIGS. 11A to 11C are conceptual views showing various forms of coupling a permanent magnet type rotor unit and a reluctance type rotor unit to each other.
Figure 11B:
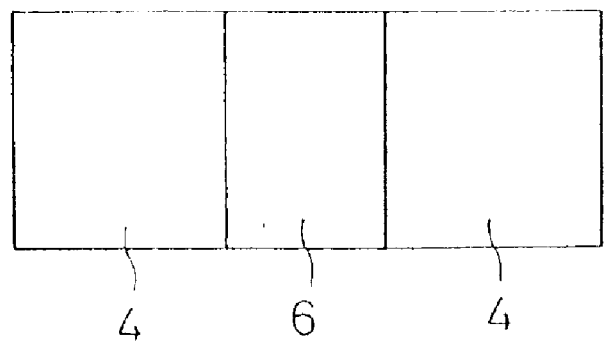
Figure 11C:
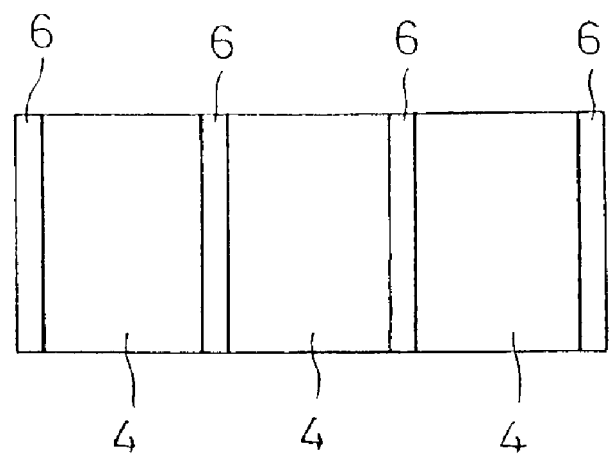

On the other hand, the various coupling combinations of the permanent magnet type rotor unit 4 and the reluctance type rotor unit 6 as shown in FIGS. 11A to 11C are also realized, in the cases of which the same effect as that described above is also obtained.

Additionally, since no nonmagnetic material is interposed between both the rotor units 4, 6, size and cost of the structure are reduced.

Furthermore, a nonmagnetic material is preferably arranged in the slits 8. This ensures the prevention of flux leakage and suppresses a reduction in strength ascribable to the slits 8.

Now, a second embodiment of the present invention will be described with reference to FIGS. 3 to 5H. In the following description of the embodiment, the same components as those of the previous embodiment will not be described again but only those characteristic parts will be described.

Figure 3:
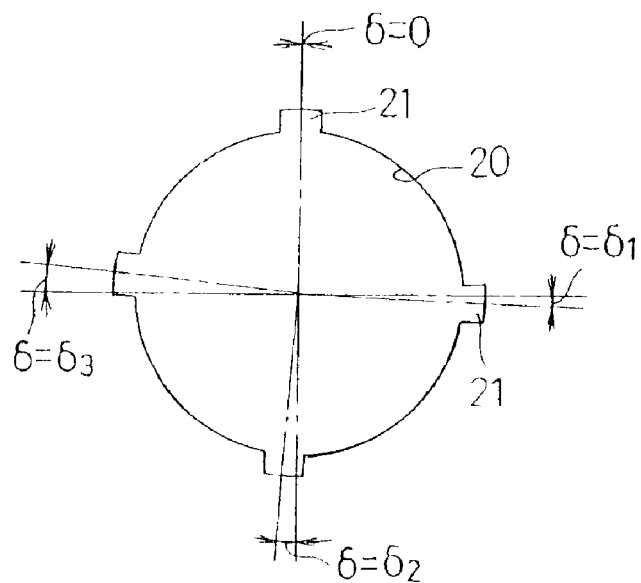
FIG. 3 is a keyway layout according to a second embodiment of the present invention.
Figure 4:
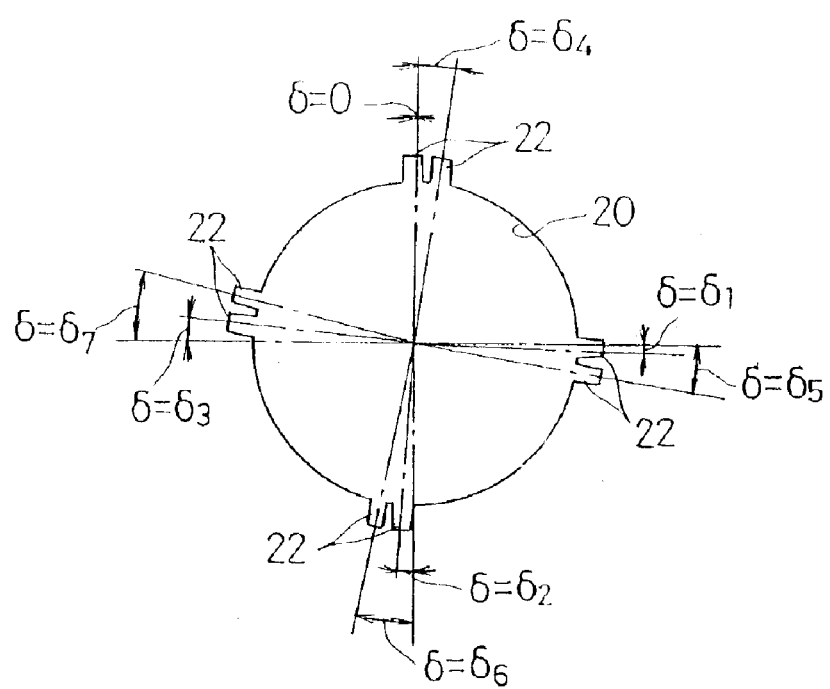
FIG. 4 is a keyway layout of a modified example of the embodiment.

In the present embodiment, as shown in FIG. 3, the permanent magnet type rotor unit 4 and the reluctance type rotor unit 6 have a shaft hole 20 into which a rotating shaft (not shown) for connecting the rotor 2 to exterior is fitted. In order to fix the rotating shaft to the permanent magnet type rotor unit 4 and the reluctance type rotor unit 6, a plurality of keyways 21 are formed in either one or both of the shaft holes 20 in the permanent magnet type rotor unit 4 and the reluctance type rotor unit 6. The plurality of keyways 21 are formed at angle deviations δ of 0°, $\delta_1$, $\delta_2$, and $\delta_3$ ($\delta_1 < \delta_2 < \delta_3$) with respect to reference lines drawn at intervals of 180° in electric angle (in the present embodiment, at intervals of 90°), respectively. This makes the relative position (angle deviation) between the permanent magnet type rotor unit 4 and the reluctance type rotor unit 6 selectable in the direction of rotation. Alternatively, as shown in FIG. 4, keyways 22 of relatively small width may be formed around the shaft hole(s) 20 at angle deviations δ of 0°, $\delta_1$, $\delta_2$, $\delta_3$, $\delta_4$, $\delta_5$, $\delta_6$, and $\delta_7$ ($\delta_1 < \delta_2 < \delta_3 < \delta_4 < \delta_5 < \delta_6 < \delta_7$) with respect to the reference lines. In this case, the range of adjustments in angle deviation is expanded further.

According to the foregoing configuration, the keyways 21 or 22 are selectable for satisfying torque characteristic requirements. The motor is thus used common to a variety of torque characteristic requirements with a reduction in cost.

Figure 5A:
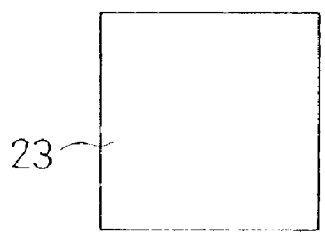
FIGS. 5A to 5H are explanatory diagrams showing various key shapes according to the embodiment.

The above-mentioned keyways 21, 22 are preferably different from one another in shape according to angle deviations. For example, FIG. 5A shows a key 23 for fixing the permanent magnet type rotor unit 4. FIGS. 5B to 5H show keys 24 for fixing the reluctance type rotor unit 6. The keys 24 of FIGS. 5B to 5H shall be selected depending on the angle deviation at the fixed position of the reluctance type rotor unit 6 in the direction of rotation. Meanwhile, the keyways 21, 22 in the shaft hole 20 of the reluctance type rotor unit 6 are formed into keyway shapes corresponding to respective angle deviations. This facilitates assembly into a position of an angle deviation suited to desired torque characteristics without fault.

Figure 5B:
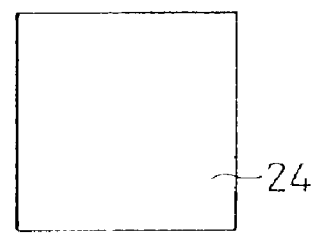
Figure 5C:
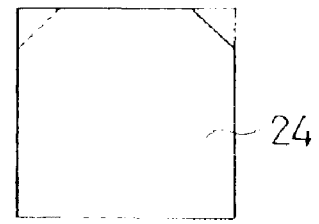
Figure 5D:
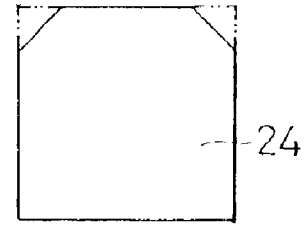
Figure 5E:
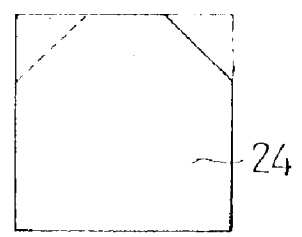
Figure 5F:
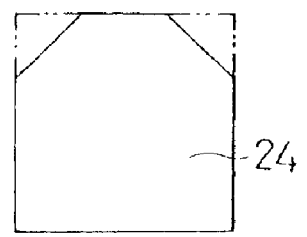
Figure 5G:
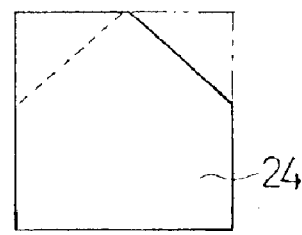
Figure 5H:
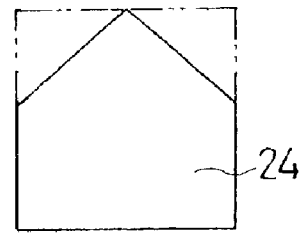

Among the shown examples, FIG. 5B is of a basic shape having a rectangular cross section. FIGS. 5C, 5E, and 5G are ones chamfered at either corner, and FIGS. 5D, 5F, and 5H at both corners, with the amounts of chamfer increased in succession. In this way, one of the plurality of keyways 21, 22 is formed into the basic shape shown in FIG. 5B, and the rest of the keyways 21, 22 are formed into the shapes shown in FIGS. 5C to 5H, different at least in part from the basic shape. This allows commonality of keys 24 and requires partial machining alone to achieve the various shapes, thereby contributing a reduction in cost.

Figure 6:
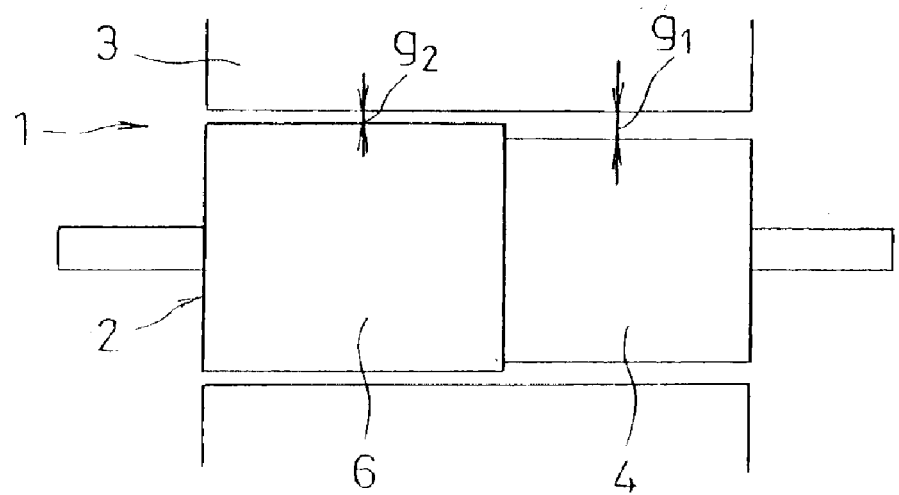
FIG. 6 is a schematic diagram showing the configuration of a motor according to a third embodiment of the present invention.

Now, a third embodiment of the present invention will be described with reference to FIG. 6.

In this embodiment, a clearance $g_2$ between the reluctance type rotor unit 6 and the stator 3 is made smaller than a clearance $g_1$ between the permanent magnet type rotor unit 4 and the stator 3.

According to the present embodiment, the permanent magnet type rotor unit 4 which undergoes higher centrifugal distortion due to the provision of the permanent magnets 5 is given the greater clearance $g_1$. Consequently, the permanent magnet type rotor unit 4 and the reluctance type rotor unit 6 are made equal in the limit of rotation speed, thereby allowing higher rotation speed. Since the clearance $g_1$ of the permanent magnet type rotor unit 4 has a small influence on torque characteristics and the clearance $g_2$ of the reluctance type rotor unit 6 has a great influence on the torque characteristics, the reluctance type rotor unit 6 exercises a significant effect of improving the torque characteristics. The reluctance type rotor unit 6 improves in efficiency accordingly, with an improvement in motor efficiency.

Figure 7:
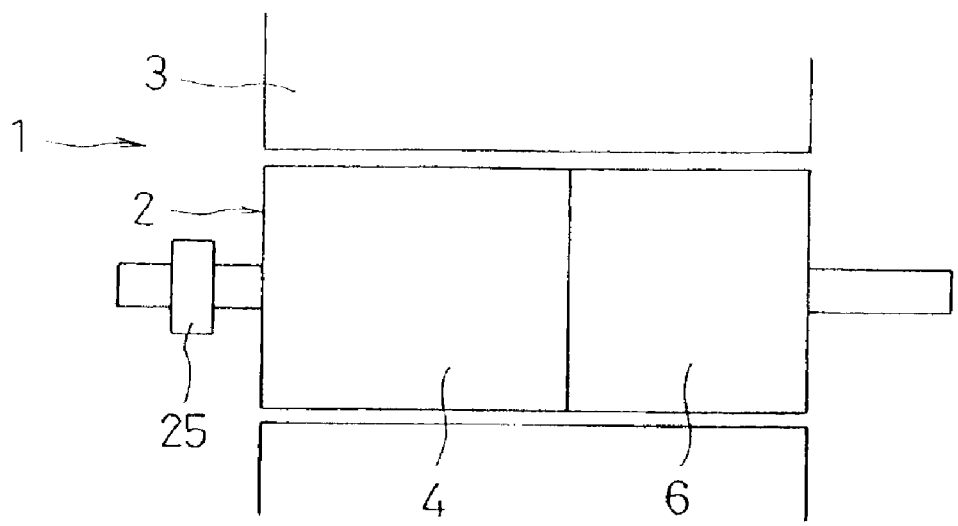
FIG. 7 is a schematic diagram showing the configuration of a motor according to a fourth embodiment of the present invention.

Now, a fourth embodiment of the present invention will be described with reference to FIG. 7.

The present embodiment provides at least one bearing 25 for supporting the rotor 2 rotatably. The bearing 25 of greater supporting strength is arranged on the side of the permanent magnet type rotor unit 4. In the shown example, a single bearing 25 is arranged on the side of the permanent magnet type rotor unit 4. When bearings 25 are arranged on both sides, the one arranged on the side of the permanent magnet type rotor unit 4 shall be greater in size and in supporting strength.

According to the present embodiment, the rotor 2 is stably supported with compact configuration because of the rational bearing arrangement that the rotor 2 is supported by a bearing 25 of greater supporting strength of the side of the permanent magnet type rotor unit 4 which is high in mass.

Figure 8:
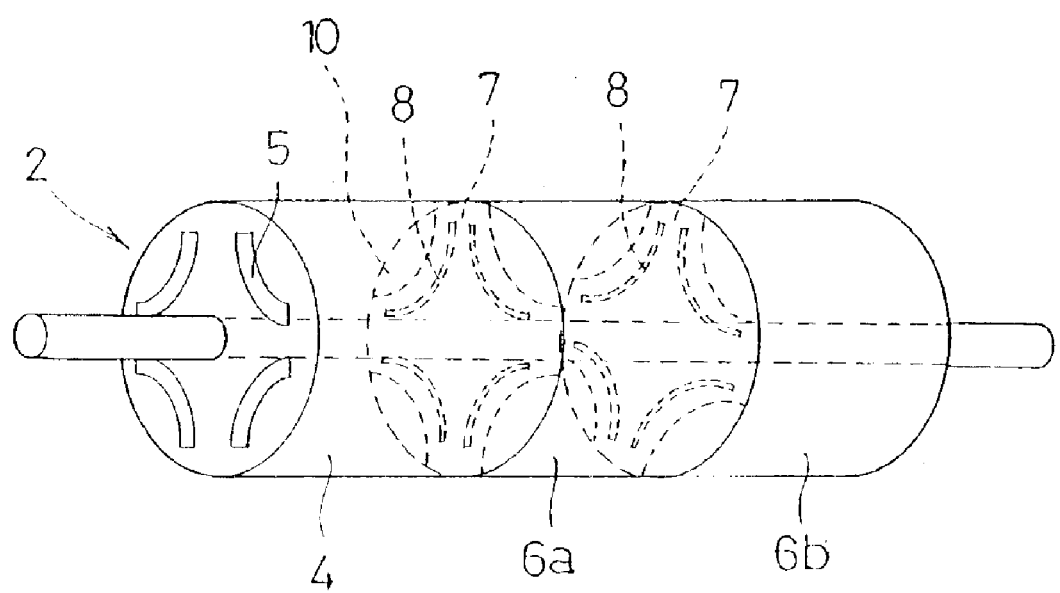
FIG. 8 is a schematic diagram showing the configuration of a motor according to a fifth embodiment of the present invention.

Now, a fifth embodiment of the present invention will be described with reference to FIG. 8.

The foregoing embodiments have dealt with the cases where the rotor 2 is composed of a permanent magnet type rotor unit 4 and a single reluctance type rotor unit 6 which are directly connected in the axial direction, and the permanent magnet type rotor unit 4 and the reluctance type rotor unit 6 have an angle deviation therebetween. In the present embodiment, the rotor 2 is composed of the permanent magnet type rotor unit 4, a first reluctance type rotor unit 6a adjoining thereto, and a second reluctance type rotor unit 6b adjoining to the first reluctance type rotor unit 6a. The first reluctance type rotor unit 6a has slits 8 or notches 10 for preventing flux leakage from the permanent magnets 5 and has no angle deviation from the permanent magnet type rotor unit 4 in the direction of rotation, and the second reluctance type rotor unit 6b has an appropriate angle deviation from the permanent magnet type rotor unit 4 in the direction of rotation.

According to the present embodiment, the absence of an angle deviation between the permanent magnet type rotor unit 4 and the first reluctance type rotor unit 6a surely prevents flux leakage from the permanent magnets 5 at between the rotor units 4 and 6a, thereby avoiding deterioration in characteristics. Besides, the absence of a nonmagnetic material therebetween allows compact configuration and cost reduction without necessitating a drop in torque for the sake of flux leakage prevention. In addition, the provision of an arbitrary angle deviation between the first and second reluctance type rotor units makes it possible to obtain reduced vibration.

Figure 9A:
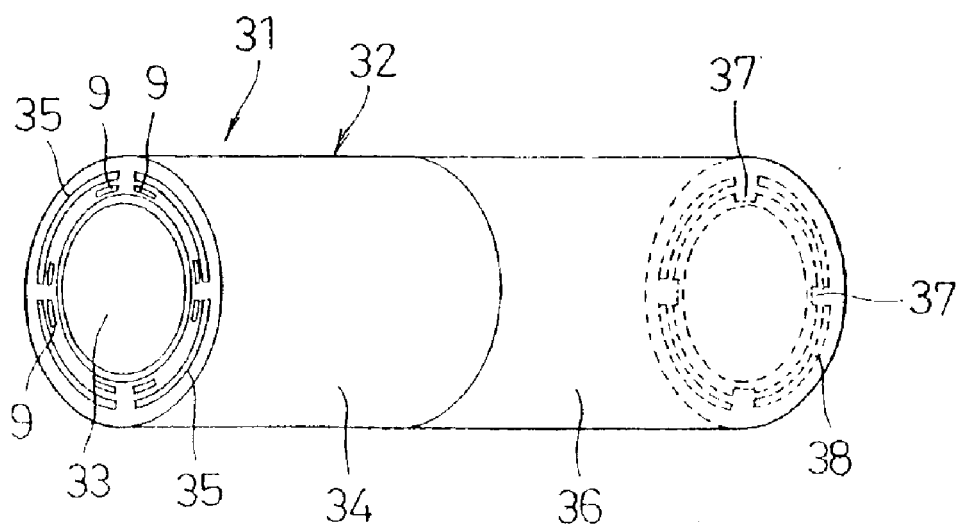
FIG. 9A is a schematic diagram showing the configuration of a motor according to a sixth embodiment of the present invention and FIG. 9B is a front view showing the upper half of a permanent magnet type rotor unit according to the sixth embodiment.

Now, a sixth embodiment of the present invention will be described with reference to FIGS. 9A and 9B.

The foregoing embodiments have dealt with the cases where the present invention is applied to an inner rotor type motor. The present embodiment, as shown in FIG. 9A, is an outer rotor type motor 31 which has a rotor 32 rotatably arranged around a stator 33. The rotor 32 is composed of a permanent magnet type rotor unit 34 having a plurality of permanent magnets 35 and a reluctance type rotor unit 36 having a plurality of magnetic salient pole portions 37. The rotor units 34 and 36 are coupled with an angle deviation therebetween in the direction of rotation. Slits 38 for preventing flux leakage from the permanent magnets 35 are formed in the reluctance type rotor unit 36 with the angle deviation.

Figure 9B:
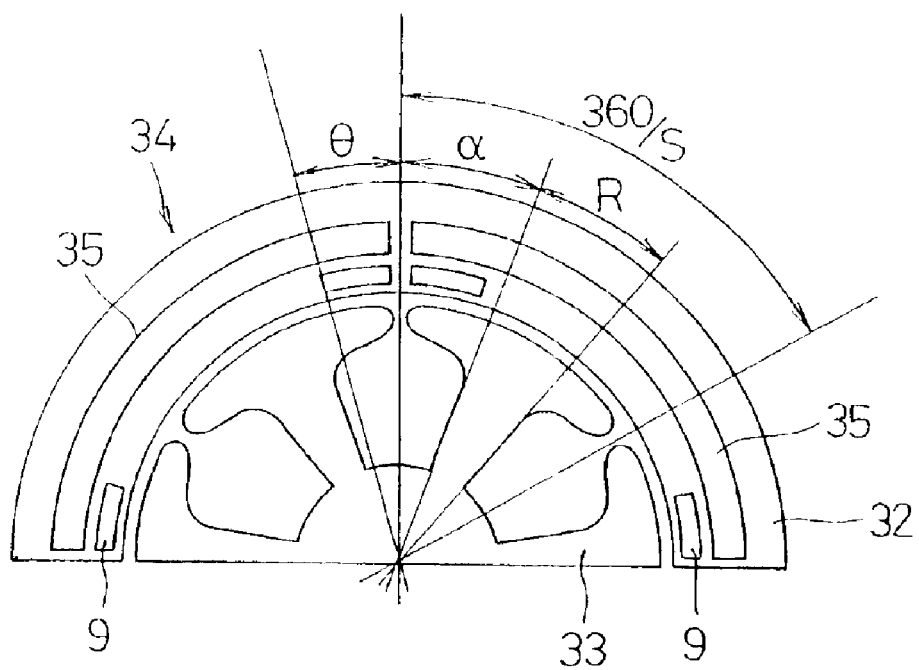

As shown in FIG. 9B, elongated holes 9 are arranged within a predetermined range along the outer circumferential surface of the rotor 32 near both the ends of the permanent magnet 35 of the rotor 32 in the direction of rotation. The elongated holes 9 are arranged within the range defined so that $0.95\alpha \leq \theta \leq 1.05\alpha$ with $\alpha = \{(360/S) - R\}/2$ (degrees), where the number of rotor slots is $S(=3P/2)$, and the number of rotor poles is $P(=2n)$. In the equations, $\theta$ is the angle formed between a magnetic pole boundary and the center of the elongated hole 9 in the forward direction of rotation of the rotor pole with respect to the center of a rotating shaft, and R is the angle formed by the tooth width of the stator 33 with respect to the center of the rotating shaft.

Even in such an outer rotor type motor 31, the application of the present invention offers the same operation and effects as in the foregoing embodiments.

The motors 1, 31 of the foregoing embodiments are compact in size, high in output, and high in efficiency, and thus are suitably applicable to the compressor-driving motor. In addition, the motors 1, 31 may be suitably applied to the driving motors in fuel-cell, hybrid, and other types of electric vehicles, and the driving motors of high-power fans.

Figure 13:
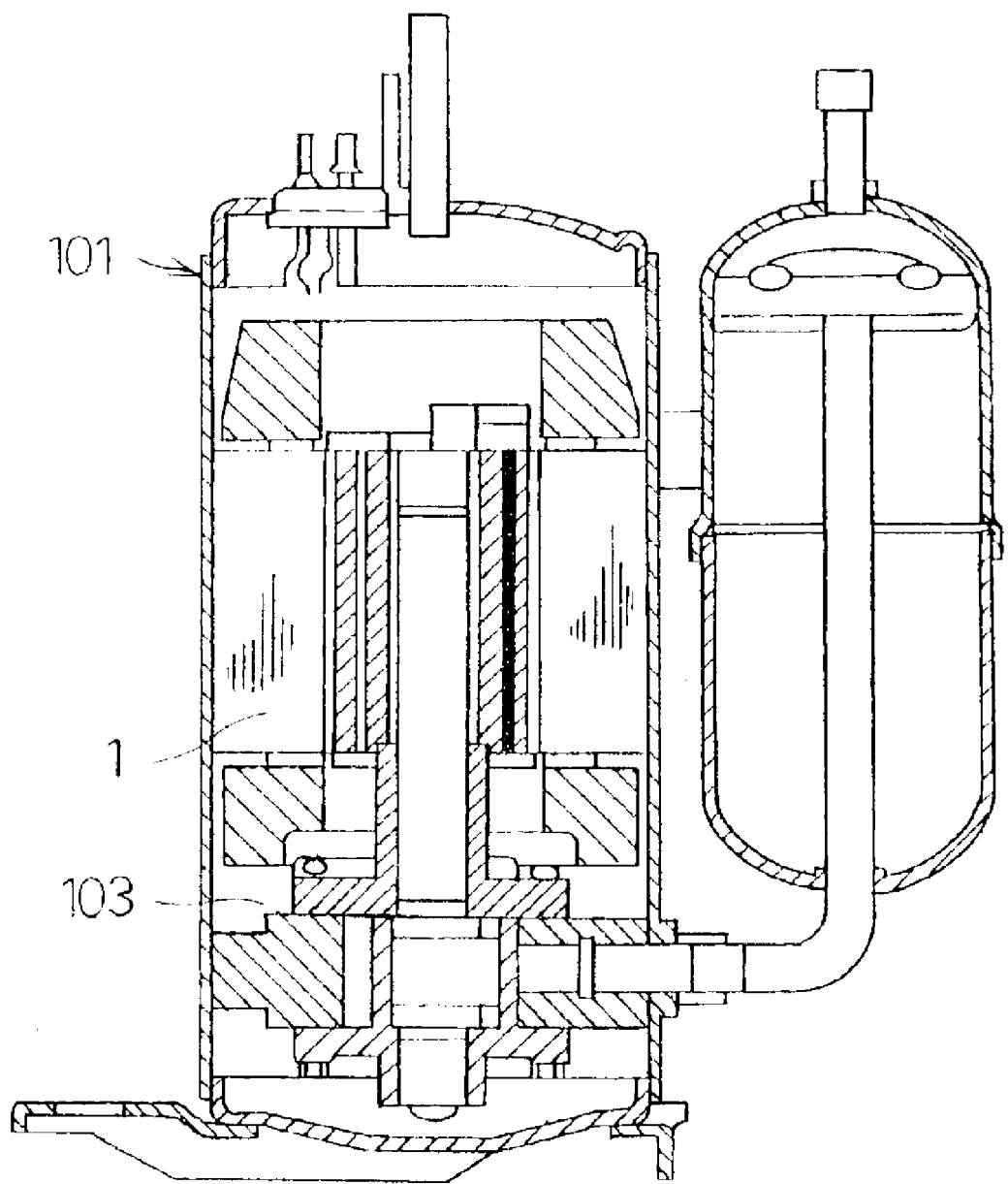
FIG. 13 is a longitudinal sectional view showing the configuration of a compressor comprising the motor according to the present invention.

As shown in FIG. 13, a compressor 101 comprises the motor 1 of the present invention and a compressing portion 103. According to this configuration, the compressor 101, with the motor 1 comprised therein, is reduced in vibrations and noise. Besides, deterioration in characteristics due to the flux leakage is prevented, efficiency of this compressor is increased.

Figure 14:
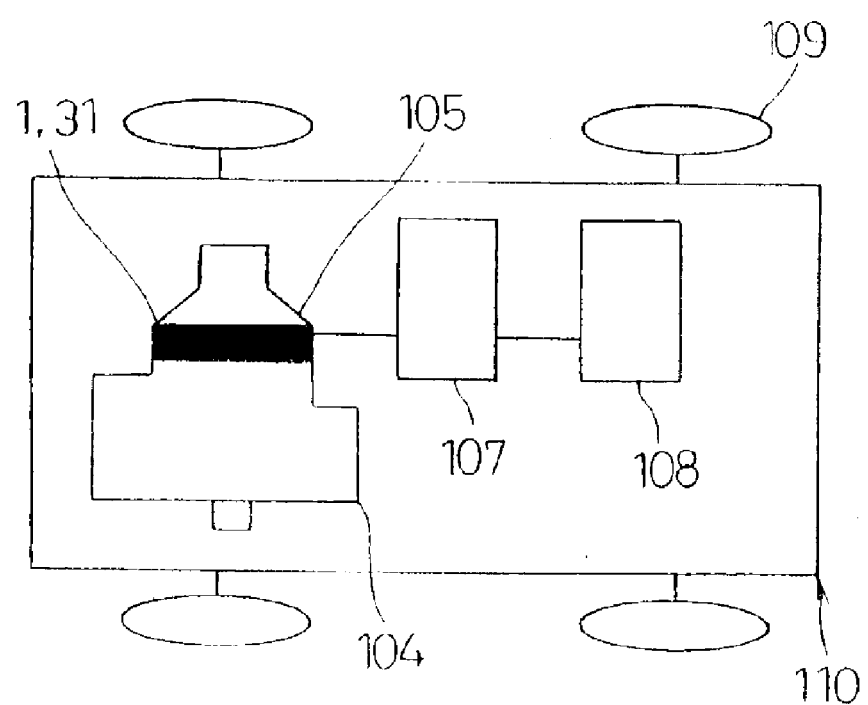
FIG. 14 is a schematic diagram showing the configuration of a hybrid type electric vehicle comprising the motor according to the present invention.

FIG. 14 is a schematic diagram showing the configuration of a hybrid type electric vehicle 110 comprising the motor 1, 31 according to the present invention. According to FIG. 14, said hybrid type electric vehicle 110 also comprises an engine 104, a transmission 105, an inverter 107 as a charge regulator, a battery 108 as a power storage/power supply means, and wheels 109. According to this configuration, the hybrid type electric vehicle 110, with the motor 1, 31 of the present invention comprised therein, is reduced in vibrations and noise. Besides, deterioration in characteristics due to the flux leakage is prevented, running efficiency of this hybrid type electric vehicle is increased.

Figure 15:
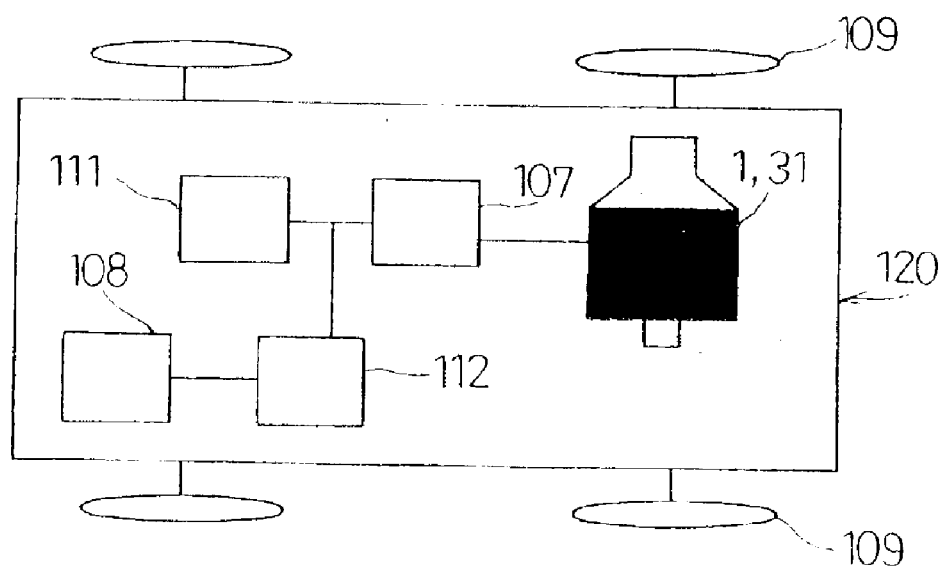
FIG. 15 is a schematic diagram showing the configuration of a fuel-cell electric vehicle comprising the motor according to the present invention.

FIG. 15 is a schematic diagram showing the configuration of a fuel-cell electric vehicle 120 comprising the motor 1, 31 of the present invention. According to FIG. 15, said fuel-cell electric vehicle 120 also comprises a charge regulator (an inverter) 107, a power storage/power supply means (a battery) 108, wheels 109, a fuel-cell 111, and a DC-to-DC converter 112. According to this configuration, the fuel-cell electric vehicle 120, with the motor 1, 31 of the present invention comprised therein, is reduced in vibrations and noise. Besides, deterioration in characteristics due to the flux leakage is prevented, running efficiency of this fuel-cell electric vehicle is increased.

Figure 16:
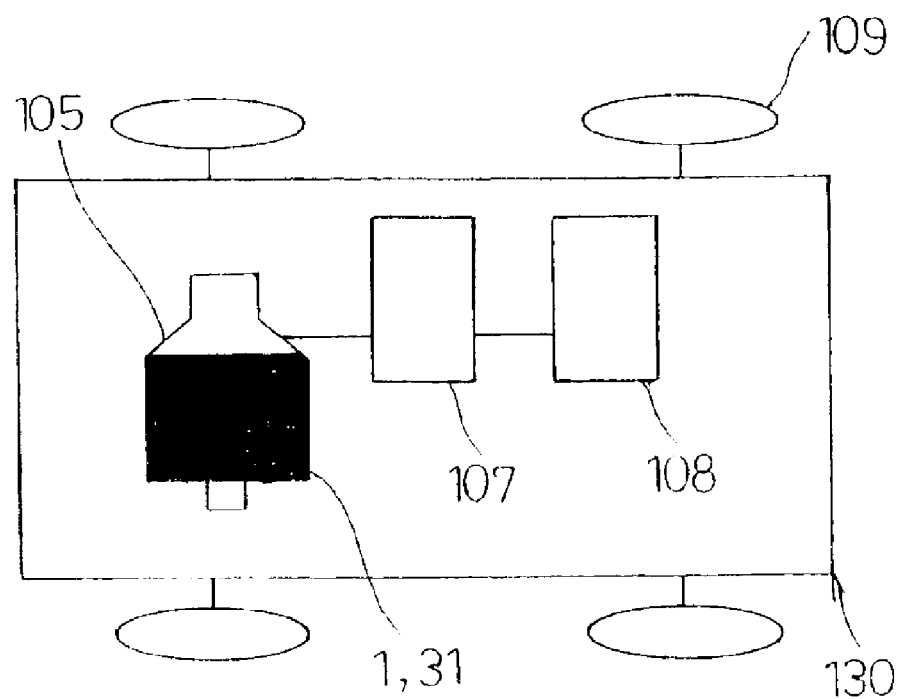
FIG. 16 is a schematic diagram showing the configuration of an electric vehicle comprising the motor according to the present invention.

FIG. 16 is a schematic diagram showing the configuration of an electric vehicle 130 comprising the motor 1, 31 of the present invention. According to FIG. 16, said electric vehicle 130 also comprising a transmission 105, a charge regulator (an inverter) 107, a power storage/power supply means (a battery) 108, and wheels 109. According to this configuration, the electric vehicle 130, with the motor 1, 31 of the present invention comprised therein, is reduced in vibrations and noise. Besides, deterioration in characteristics due to the flux leakage is prevented, running efficiency of this electric vehicle is increased.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A motor comprising:
   a rotor including a permanent magnet type rotor unit having a plurality of permanent magnets, and a reluctance type rotor unit having a plurality of magnetic salient pole portions and a plurality of slits for preventing magnetic flux leakage, said permanent magnet type rotor unit and said reluctance type rotor unit being coupled to each other in an axial direction with a predetermined angle deviation in a direction of rotation; and
   a stator for generating a field for driving said rotor, wherein
   elongated holes or notches for preventing short-circuit of magnetic fluxes are arranged near edges of said permanent magnets of the permanent magnet type rotor unit, and the elongated holes or the notches are arranged within a range defined so that $0.95\alpha \leq \theta \leq 1.05\alpha$ with $\alpha=\{(360/S)-R\}/2$ (degrees), where $\theta$ is an angle formed between a magnetic pole boundary and a center of the elongated hole or the notch in a forward direction of rotation of the rotor with respect to a center of a rotating shaft, R is an angle formed by a tooth width of the stator with respect to the center of the rotating shaft, P is the number of rotor poles, and the number of stator slots is S=3P/2.

2. The motor according to claim 1, wherein the slits of said reluctance type rotor unit are arranged with a nonmagnetic element having a shape corresponding to said slits.

3. The motor according to claim 1, wherein a clearance between said reluctance type rotor unit and said stator is made smaller than a clearance between said permanent magnet type rotor unit and said stator.

4. The motor according to claim 1, wherein a bearing for rotatably supporting said rotor is provided, and a bearing having greater supporting strength is arranged on a side of said permanent magnet type rotor unit.

5. The motor according to claim 1, wherein said rotor includes a first reluctance type rotor unit adjoining to said permanent magnet type rotor unit and a second reluctance type rotor unit adjoining to said first reluctance type rotor unit alone, said first reluctance type rotor unit has slits for preventing magnetic flux leakage from said permanent magnets, the first reluctance type rotor unit having no angle deviation to said permanent magnet type rotor unit in the direction of rotation, and said first reluctance type rotor unit and said second reluctance type rotor unit have an angle deviation therebetween in the direction of rotation.

6. The motor according to claim 1, wherein a plurality of keyways are formed for fixing a rotating shaft to said permanent magnet type rotor unit and said reluctance type rotor unit to allow for selecting a relative position between said permanent magnet type rotor unit and said reluctance rotor type unit in a direction of rotation, said rotating shaft connecting said rotor to exterior.

7. The motor according to claim 1, wherein said rotor is formed in a cylindrical shape and arranged rotatably around said stator.

8. A motor comprising:
a rotor having a plurality of permanent magnets; and
a stator for generating a field for driving said rotor, wherein
elongated holes or notches for preventing short-circuit of magnetic fluxes are arranged near edges of said permanent magnets of said rotor, and
the elongated holes or the notches are arranged with in a range defined so that $0.95\alpha \leq \theta \leq 1.05\alpha$ with $\alpha=\{(360/S)-R\}/2$ (degrees), where $\theta$ is an angle formed between a magnetic pole boundary and a center of the elongated hole or the notch in a forward direction of rotation of the rotor with respect to a center of a rotating shaft, R is an angle formed by a tooth width of the stator with respect to the center of the rotating shaft, P is the number of rotor poles, and the number of stator slots is S=3P/2.

9. The motor according to claim 8, wherein said rotor is formed in a cylindrical shape and arranged rotatably around said stator.

10. A compressor comprising the motor according to claim 1.

11. A hybrid type electric vehicle comprising the motor according to claim 1.

12. A fuel-cell electric vehicle comprising the motor according to claim 1.

13. An electric vehicle comprising the motor according to claim 1.

14. The motor according to claim 2, wherein a clearance between said reluctance type rotator unit and said stator is smaller than a clearance between said permanent magnet type rotor unit and said stator.

15. The motor according to claim 2, further comprising a first bearing that rotatably supports said rotator and a second bearing having greater supporting strength than said first bearing provided on a side of said permanent magnet type rotator unit.

16. The motor according to claim 2, wherein said rotor includes a first reluctance type rotor unit adjoining said permanent magnet type rotor unit and a second reluctance type rotor unit adjoining said first reluctance type rotor unit alone, said first reluctance type rotor unit has slits for preventing magnetic flux leakage from said permanent magnets, the first reluctance type rotor unit having no angle deviation with respect to said permanent magnet type rotor unit in the direction of rotation, and said first reluctance type rotor unit and said second reluctance type rotor unit having an angle deviation therebetween in the direction of rotation.

17. The motor according to claim 2, further comprising a plurality of keyways that fix a rotating shaft to said permanent magnet type rotor unit and said reluctance type rotor unit to allow for selecting a relative position between said permanent magnet type rotor unit and said reluctance rotor type unit in a direction of rotation, said rotating shaft connecting said rotor to an exterior.

18. A compressor comprising the motor according to claim 7.

19. A compressor comprising the motor according to claim 8.

20. A compressor comprising the motor according to clam 9.

21. A hybrid type electric vehicle comprising the motor according to claim 7.

22. A hybrid type electric vehicle comprising the motor according to claim 8.

23. A hybrid type electric vehicle comprising the motor according to claim 9.

24. A fuel-cell electric vehicle comprising the motor according to claim 7.

25. A fuel-cell electric vehicle comprising the motor according to claim 8.

26. A fuel-cell electric vehicle comprising the motor according to claim 9.

27. An electric vehicle comprising the motor according to claim 7.

28. An electric vehicle comprising the motor according to claim 8.

29. An electric vehicle comprising the motor according to claim 9.

* * * * *

UNITED STATES PATENT AND TRADEMARK OFFICE
CERTIFICATE OF CORRECTION

PATENT NO. : 6,858,961 B2 Page 1 of 1
APPLICATION NO. : 10/229129
DATED : February 22, 2005
INVENTOR(S) : M. Tagome et al.

It is certified that error appears in the above-identified patent and that said Letters Patent is hereby corrected as shown below:

At column 10, line 43 (claim 20, line 1), "clam" should be --claim--.

Signed and Sealed this

Fourth Day of July, 2006

JON W. DUDAS
*Director of the United States Patent and Trademark Office*